Aug. 7, 1923.
R. L. BALDWIN
ANIMAL TRAP
Filed March 21, 1922
1,463,787
2 Sheets-Sheet 1
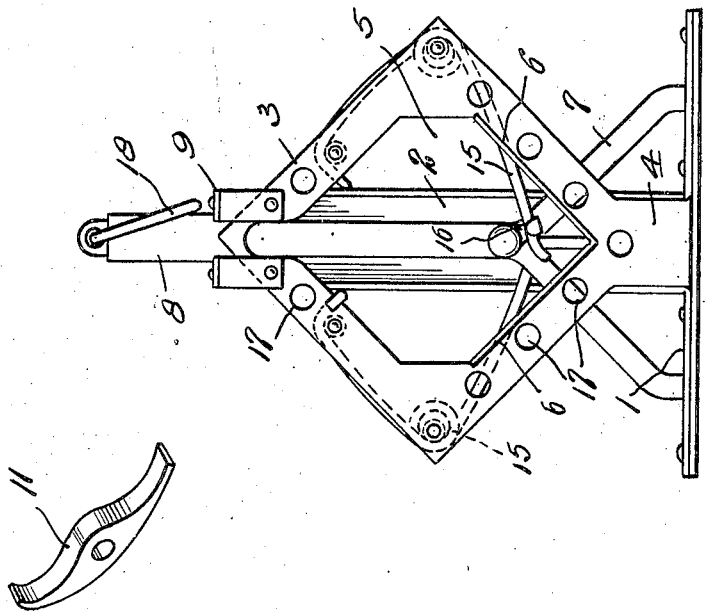
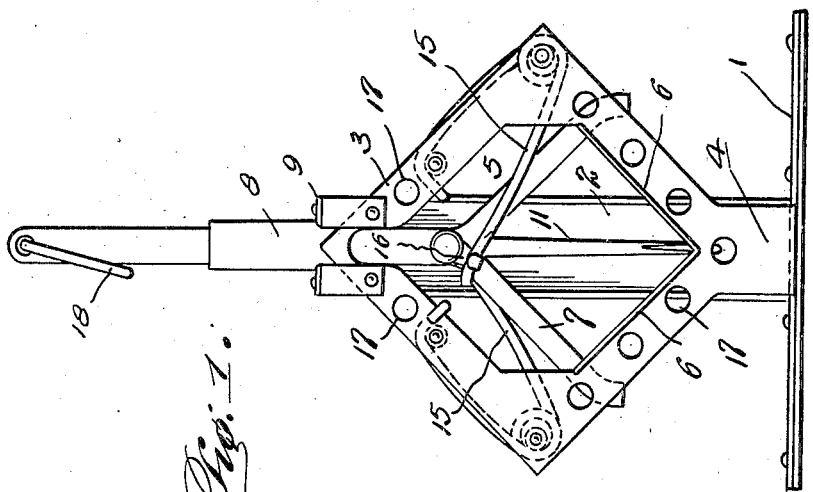
Robert L. Baldwin,
INVENTOR
BY Victor J. Evans.
ATTORNEY
WITNESSES:

Aug. 7, 1923.
R. L. BALDWIN
ANIMAL TRAP
Filed March 21, 1922
1,463,787
2 Sheets-Sheet 2
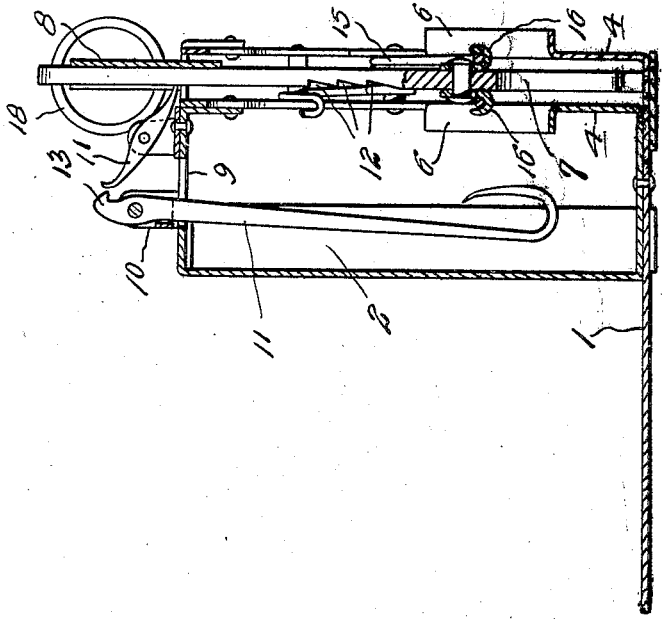
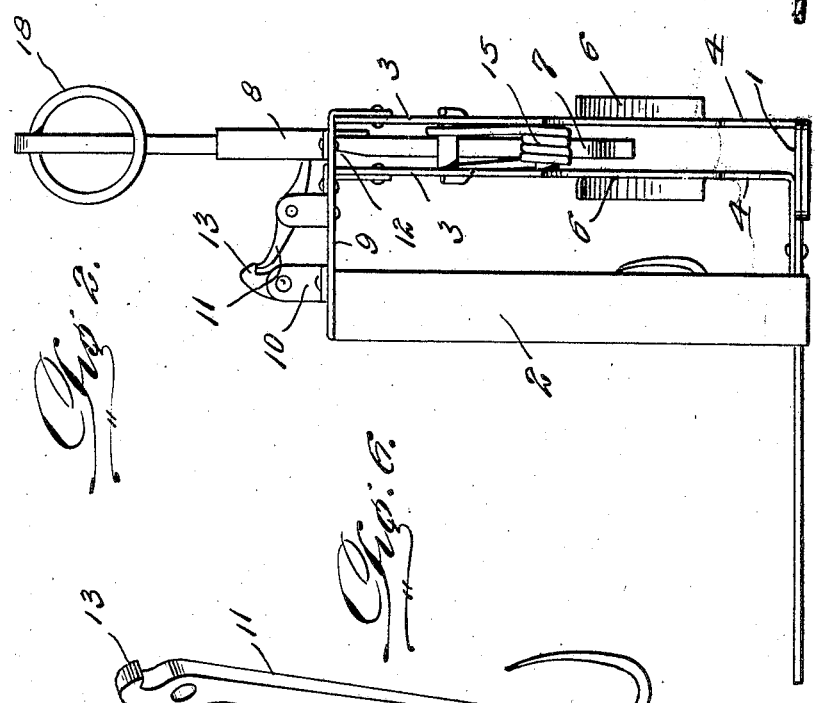

Patented Aug. 7, 1923.

1,463,787

UNITED STATES PATENT OFFICE.

ROBERT L. BALDWIN, OF CANON CITY, COLORADO.

ANIMAL TRAP.

Application filed March 21, 1922. Serial No. 545,463.

*To all whom it may concern:*

Be it known that I, ROBERT L. BALDWIN, a citizen of the United States, residing at Canon City, in the county of Fremont and State of Colorado, have invented new and useful Improvements in Animal Traps, of which the following is a specification.

This invention relates to animal traps, the general object of the invention being to provide a trap which will kill the animal almost as soon as it is caught and thus prevent suffering as occurs when an animal is caught by the traps now in use.

Another object of the invention is to so form the trap that the animal will be caught by the neck and thus quickly strangled.

A further object of the invention is to make the trigger parts adjustable, so that the trap can be sprung with either a slight pull on the bait or a strong one.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of a trap constructed in accordance with my invention.

Figure 2 is a side view.

The remaining figures are detail views.

In these views 1 indicates a base which is of substantially T-shape, 2 indicates an upright bait casing supported on the base and 3 indicates a pair of spaced members of rectangular form, each having one corner connected with the base by the uprights 4. These members are formed with large openings 5 through which the animal reaches the bait in the casing. Flanges 6 extend outwardly from the lower walls of the openings so as to present comparatively wide surfaces against which the animal is pressed by the movable jaw member to prevent cutting by the thin edges of the members 3. The jaw member 7 has its lower end of fork-shape and its upper part slides through the guide 8 which is located above the space between the two members and is carried by a plate 9 which is connected with the top of the bait casing and the top of the inner member 3. This plate also carries the lugs 10 between which the trigger lever 11 is pivoted, the forward end of this lever being adapted to engage any one of a plurality of notches 12 in the stem of jaw 7 and its other end engaging a notch in the upper end of the bait hook 13, which passes through the bait casing and has its upper end pivoted between lugs and the plate 9. The rear part of the guide 8 is slotted to permit the trigger lever to engage the notches in the stem of the movable jaw. Springs 15 are suitably supported by the members 3, in the space between the members, and one end of each spring engages a hook 16 which is pivoted to the jaw 7 at the junction of its stem with the forked part. These springs hold the ends of the prongs against the base, the parts being so formed that in this position the junction of the prongs will be close to the lower corners of the openings in the members 3 so that an animal caught between these parts will be quickly choked to death, the flanges 6 preventing the edges of the openings from cutting the fur. Holes 17 are formed in the various parts for permitting the trap to be fastened to logs or other objects and also for permitting grass, moss or the like to be fastened to the trap to disguise the same. A ring 18 is connected with the upper end of the jaw member to facilitate the raising of the same. I prefer to make the frame parts of pressed metal and of two pieces, one piece including one of the members 3 and the base and the other piece the other member, the bait casing and the plate 9 and its lugs and guide.

In setting the trap the jaw 7 is raised, by means of the ring 18, until the forward end of the trigger lever engages one of the notches in the stem of the jaw, the other end of the lever being engaged by the notched upper end of the bait hook so that the said jaw is held in raised position by the lever. In this position of the jaw the forked part and the lower walls of the openings in members 3 will form a passage through which the animal can reach the bait upon the bait hook and this passage can be adjusted in size by placing the lever in the desired notch in the jaw. Thus the trap can be set to catch different sizes of animals. By adjusting the point of contact between the lever and bait hook the trap can be sprung by a slight pull on the bait hook or a heavy one. As soon as the animal grips the bait and starts to pull it from the hook the trigger lever will be released so that the springs will project the jaw downwardly and thus grip the animal between the forked end of the jaw and the flanged lower edges of the openings.

As before stated, this trap will quickly kill the animal, without injuring the fur, so that the trap is a humane one.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A trap of the class described comprising a base, a stationary jaw member comprising a plate having an opening therein, a movable jaw member comprising a stem having a forked end, the forked part cooperating with the stationary jaw, spring means for actuating the movable jaw and trigger mechanism for the said jaw including a bait supporting member arranged to force the animal to pass its head through the stationary jaw in order to reach the bait.

2. A trap of the class described comprising a base, a pair of frame members connected together in spaced relation, said frame members forming a stationary jaw, a jaw movable between the members and comprising a stem having a forked end, spring means for actuating the movable jaw and trigger mechanism for the movable jaw including a bait supporting member arranged to force the animal to pass its head through the stationary jaw in order to reach the bait.

3. A trap of the class described comprising a base, a pair of frame members supported thereby, said frame members forming the stationary jaw, a jaw movably mounted between the said members, spring means for actuating the movable jaw, said movable jaw including a stem having a forked lower end, said stem having a plurality of notches therein, a trigger lever for engaging one of said notches and a bait hook having a part for engaging the trigger lever.

4. A trap of the class described comprising a base, a pair of frame members supported thereby, said frame members forming the stationary jaw, a jaw movably mounted between the said members, spring means for actuating the movable jaw, said movable jaw including a stem having a forked lower end, said stem having a plurality of notches therein, a trigger lever for engaging one of said notches, a bait hook having a part for engaging the trigger lever and a casing for receiving the bait hook.

5. A trap of the class described comprising a base, a pair of upright frame members supported by the base and forming the stationary jaw, a movable jaw sliding between the members and comprising a stem and a forked part, an upright bait casing, a plate connecting the upper end of the same with one of the members of the stationary jaw, a guide on said plate for the stem of the movable jaw, spring means for actuating the movable jaw, a trigger lever pivotally supported on the plate and engaging a part of the stem for holding the movable jaw in raised position and a bait hook located in the casing, and having its upper end pivotally supported by the plate, said upper end having a projection for engaging the trigger lever.

In testimony whereof I affix my signature.

ROBERT L. BALDWIN.